(12) United States Patent
Narayanan

(10) Patent No.: US 7,493,393 B2
(45) Date of Patent: Feb. 17, 2009

(54) APPARATUS AND METHOD FOR SECURITY MANAGEMENT IN WIRELESS IP NETWORKS

(75) Inventor: Ram Gopal Lakshmi Narayanan, Woburn, MA (US)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 10/646,900

(22) Filed: Aug. 25, 2003

(65) Prior Publication Data

US 2004/0260937 A1  Dec. 23, 2004

Related U.S. Application Data

(60) Provisional application No. 60/480,234, filed on Jun. 23, 2003.

(51) Int. Cl.
*G06F 15/173* (2006.01)
(52) U.S. Cl. ...................... 709/225; 709/249
(58) Field of Classification Search ............. 713/153, 713/201; 709/225, 238, 249–250; 726/15, 726/2

See application file for complete search history.

(56) References Cited

U.S. PATENT DOCUMENTS

| | | | |
|---|---|---|---|
| 7,069,437 B2 * | 6/2006 | Williams | 713/166 |
| 7,174,564 B1 * | 2/2007 | Weatherspoon et al. | 726/2 |
| 2002/0069356 A1 * | 6/2002 | Kim | 713/160 |
| 2002/0083344 A1 * | 6/2002 | Vairavan | 713/201 |
| 2002/0095496 A1 * | 7/2002 | Antes et al. | 709/225 |
| 2004/0001475 A1 * | 1/2004 | Mikkonen | 370/351 |
| 2004/0171369 A1 * | 9/2004 | Little et al. | 455/410 |
| 2004/0208122 A1 * | 10/2004 | McDysan | 370/230 |
| 2004/0215957 A1 * | 10/2004 | Moineau et al. | 713/153 |
| 2004/0223498 A1 * | 11/2004 | Sanderson et al. | 370/395.52 |
| 2004/0225895 A1 * | 11/2004 | Mukherjee et al. | 713/201 |
| 2004/0255167 A1 * | 12/2004 | Knight | 713/201 |

FOREIGN PATENT DOCUMENTS

WO  WO 03/049377  6/2003

OTHER PUBLICATIONS

Network Working Group, Request for Comments: 3374, Problem Description: Reasons for Performing Context Transfers Between Nodes in an IP Access Network, J. Kempf, Ed., Sep. 2002.

Internet Engineering Task Force, Internet Draft, "General Requirements for a Context Transfer Framework," Hamid Syed, Gary Kenward, Pat Calhoun, Madjid Nakhjiri, Rajeev Koodli, Kulwinder Atwal, Mark Smith, Govind Krishnamurthi, May 2001.

(Continued)

*Primary Examiner*—Salad Abdullahi
(74) *Attorney, Agent, or Firm*—Squire, Sanders & Dempsey L.L.P.

(57) ABSTRACT

According to one embodiment of the invention, a distributed routing device for routing subscriber traffic flow between at least two wireless access networks and an IP network is described. The distributed routing device includes at least one instance for executing a security function on the subscriber traffic flow, so that physically one security instance for subscribers of the at least two wireless access networks is present and logically each of the at least two wireless access networks has its own security instance.

17 Claims, 7 Drawing Sheets

OTHER PUBLICATIONS

Seamoby Working Group, Internet Draft, "IPsec Context Transfer; draft-gopal-seamboy-ipsec-relocate-00.txt," Ram Gopal L., Vijay Devarapalli, Govind Krishnamurthi, Rajeev Koodli, Senthil, Sengodan, Charles E. Perkins, Nov. 12, 2001.

Seamoby Working Group, Internet Draft, "Issues in IPSec Context Transfer," L-N. Hamer, Peter Hazy, Ram Gopal L., Govind Krishnamurthi, Senthil Sengodan, Feb. 2002.

"Fast Handovers and Context Transfers in Mobile Networks," Rajeev Koodli, Charles E. Perkins, Oct. 2001.

"Network Core, Multirouter Technology Changes Everything," Dave Ginsburg, Americas Jun. 2002: Issue Highlights.

"Check Point Introduces 100 Virtual System Internet Security Solution for Data Centers," New VPN-1/FireWall-1 VSK Scales to 100 VPN-1 FireWall Systems on a Single Platform, Mar. 26, 2002.

"Distributed Firewalls," Steven M. Bellovin, Nov. 1999.

Network Working Group, Request for Comments, "Firewall Enhancement Protocol (FEP)", M. Gaynor, S. Bradner, Apr. 1, 2001.

Network Working Group, Request for Comments, "Middlebox Communications (midcom) Protocol Requirements," R. P. Swale, P. A. Mart, P. Sijben, S. Brim, M. Shore, Aug. 2002.

"The Subscriber Management System; The Catalyst for DSL Deployment," RedBack Networks.

Stefan Mink, et al. (Institut fur Telematik—Universitat Karlsruhe), Gunter Schafer (Department INFRES—Ecole National Superieure des Telecommunications), Jochen Schiller (Institut fur Telematik Universitat Karlsruhe), XP010505343, "FATIMA: A Firewall-Aware Transparent Internet Mobility Architecture", Jul. 3, 2000, pp. 172-179.

F-Secure Corporation—XP-002301611, "HIPAA Complicance & F-Secure" White Paper Jun. 2001, pp. 1-19.

* cited by examiner

APPARATUS AND METHOD FOR SECURITY MANAGEMENT IN WIRELESS IP NETWORKS

CROSS-REFERENCES TO RELATED APPLICATIONS:

This nonprovisional application claims the benefit of U.S. Provisional Application No. 60/480,234, filed Jun. 23, 2003.

BACKGROUND OF THE INVENTION

1. Field of the Invention

The invention relates to routing subscriber traffic flow in wireless IP network systems. In particular, the invention relates to establishing a secure connection of a subscriber with a wireless IP network.

2. Description of the Related Art

In wireless Internet Protocol (IP) networks, Access Routers (ARs) provide the point of attachment for Mobile Nodes (MNs). During handovers the point of attachment changes, and the mobile node may get connected to a New access Router (NR) that may be in the same or a different administrative access network domain (or in the same or a different Autonomous System (AS)). To support seamless handovers, an ongoing session of the MN should not experience any disturbance and restarting such session may not be tolerable. Prior to handover the MN is served by a Previous access Router (PR).

The typical function of an access router may include providing header compression for the packets that are destined to or from the mobile node, maintaining Internet Protocol Security Association (IPSec SA) for the MN, sending control information, performing Quality of Service (QoS) specific function on behalf of the mobile node, etc. The access router has to maintain this information pertaining to each mobile node which information is called context. In case of a handover from the PR to the NR, this context has to be transferred. More details about the context transfer can be found in the Internet Drafts by the seamoby CT design team: "Context transfer: problem statement", draft-ietf-seamoby-context-transfer-problem-stat-00.txt, and "General Requirements for a Context Transfer Framework", draft-ietf-seamoby-ct-reqs-00.txt.

The contexts represent dynamic states of each flow pertaining to mobile nodes. There are some contexts that are static but operate on the traffic. These include an Firewall Access Control List (ACL). It is not economical for low processing mobile nodes to have their own personal firewalls. For the mobile node, after initial authorization, filters are loaded either at the access router or the firewall near the perimeter of the IP network. This is referred to as Provider Provisioned Filters (PPF). A network operator on behalf of the mobile node may perform filtering operations and the mobile node will receive only legitimate packets.

Providing security gateway functions, firewall functions and access control functions at the access router complicates the design of the access router itself. Even if all the access routers have firewall capabilities there is an ultimate need of a firewall at the perimeter of the IP network to guard the network resources. This is the same case with Virtual Private Network (VPN) gateways. In most of the cases the firewalls and VPN functions may be near the wireless edge connecting to the IP network provider.

During the handover process, the entire context pertaining to MN like header compression, security, ACL for firewall, has to be relocated from the current (previous) access router PR to the new access router NR. If the handover takes place within one AS and if the firewall and an Security Gateway (SG) are at the edge of the IP network, then the firewall and IPSec context need not be relocated. In this connection it is referred to the Internet Drafts by L-N. Hamer et al.: "Issues in IPSec Context Transfer", IETF, February 2002, and Ram Gopal et al.: "IPSec Context Transfer", IETF, November 2001. The firewall and SG act as a rendezvous point for the uplink and downlink traffic for that MN within that domain.

However, in case the context transfer happens between access routers belonging to different autonomous systems then the entire context has to be relocated. This involves a pre-authorization of the mobile node, resolving the preferences of the mobile node, accommodating the firewall ACL, programming the firewalls, involving the security gateways to move the context and to remain established to the Correspondent Node (CN) . It has been discussed that for Voice over Internet Protocol (VoIP) to avoid glitches during the handover, the complete transfer operation should be less than 100 msec. For example, this concept was described by R. Koodli and C. Perkins in "Fast handovers and context transfers in Mobile networks", Computer Communication Review, a publication of ACM SIGCOMM, volume 31, number 5, October 2001.

In the following there will be described the problems associated with traditional firewalls and why they cannot be used in mobile networks. Then the problem associated with firewall and security context transfer will be addressed.

Recent explosion of vulnerabilities around the Internet and its applications has brought the attention to firewalls which are becoming increasingly important. A firewall is a device (or may be a software) that provides single point trust relationship for the entire network. Such firewall devices are deployed at the perimeter of the IP network and guard against external attacks from hackers. Firewalls play an important role in protecting network resources and are applicable for both IPv4 and IPv6 type of networks. Firewall functions may vary from a simple packet filtering device to a sophisticated firewall that allows dynamic pinhole creations (e.g. see the Internet Draft by R. P. Swale et al.: "Middlebox Communications (midcom) Protocol Requirements", IETF, November 2001 with the help of either authorized users or from Firewall Control Proxies (e.g. see M. Gaynor and S. Bradner: "Firewall Enhancement Protocol", RFC 3093, IETF, April 2001.

Traditional firewalls are topology sensitive and use an Access Control List (ACL) to control the access to the inside network. In IPv4 type of networks, most of the firewalls have Network Address Translation (NAT) capabilities integrated onto it, and some vendors even provide a Virtual Private Network (VPN) integrated with firewalls (e.g. see Next generation firewalls, www.checkpoint.com), as it provides easy configuration, logging and improved access control management. Firewalls are going to play an important role in wireless access networks. The key problem for wireless networks is that mobile nodes are not associated with only one network. If a mobile node is attached to a visiting access network (or foreign access network), firewalls in that network will not allow the packets from the visiting mobile node to go through the Internet. The IP address of the visiting network does not confirm to the current topology. To overcome this problem a distributed firewall mechanism has been proposed by Steven Bellovin: "Distributed Firewall", www.usenix.org/publications/login/1999-11/features/firewalls.html.

For cellular networks where there are thousands of mobile nodes it will not be a practical solution to distribute the policy information using the distributed firewall mechanism and it will not scale. Whether the approach of distributed firewall will be present or not is a matter of network administrator's choice. But the traditional firewalls will always be present to protect the wireline infrastructure.

So far the problem of traditional firewalls has been discussed above, it may not be possible for the mobile node to perform firewall operations itself. This necessitates the network to perform firewall operations on behalf of each mobile node. The firewall for such environment will have a huge number of ACLs.

Another problem is associated with IPSec security context. It may not be possible for the access router performing routing functions to act as VPN gateway. The VPN gateway may be positioned near the perimeter of the wireline IP network. In such a configuration, the context transfer operation may be complicated if a handover occurs between autonomous systems. First the context has to be collected by the PR and then moved to the NR.

It has been studied that for supporting seamless operations for a VoIP session the context transfer operation should be less than 100 msec as mentioned above. This time is critical if the IPSec security associations or if firewall rules have to be created and if ACL has to be validated. The IPSec context transfer and firewall context are the key contexts which are needed to authorize the mobile node in the new visitor domain.

FIG. 1 illustrates an example of the problem where a handover occurs between a PR and an NR, and as a result of this the MN is moved from a customer access network C-1 to a customer access network C-2. C-1 and C-2 may belong to independent autonomous systems or may get Internet connection from the same Internet Service Provider (ISP). From the view of the wireline network both C-1 and C-2 may be a stub network, but from wireless network perspective they support foreign traffic to be tunneled by a Border Router (BR). ISP AS-1 and ISP AS-2 provide network connectivity for customer access networks. AS-1 and AS-2 may or may not be a backbone carrier; such autonomous system provider may be a customer of some core or backbone Internet service provider. Here, the term "provider" refers to someone who provides edge services to the wireless access networks (i.e. AS-1, AS-2), "customer" refers to a wireless service provider (i.e. C-1 to C-6), and "subscriber" refers to a wireless end user.

FIG. 1 shows an example of a customer or provider managed network at the customer's premise. As shown in FIG. 1, each customer has his/her own border router, firewall and security gateways deployed at the perimeter of the network. Border router should be understood as a broad term. A customer can either run Border Gateway Protocol (BGP) or Routing Information Protocol (RIP) or may be using simple static routing towards the provider. It may be possible that the provider either manages the customers' border router or the customers themselves can manage their border routing. Either one of these can be a provider managed equipment or a customer managed equipment at the customer's premise. It should be noted that in most of the cases the provider has more control over the customer routes and traffic.

FIG. 2 illustrates an example of an alternative configuration, where the AS-1 provider manages all the customers' routers and peering in one border router. This is a common situation and all the customers traffic is aggregated at a single router. However, this does not eliminate any of the processing for customer networks. Customers still need to have a home agent, firewall, VPN and other functions for supporting the wireless network. Whether it is a provider-managed equipment or a customer-managed equipment, routing, firewalls and security gateways are separate entities. VR (Virtual Routing) (e.g. see "Multiple Context", www.redback.com) can be performed at the provider router and shares a single physical box. But this does not eliminate the customer premise router. During the handover the entire context pertaining to the mobile node has to be relocated from the old customer network to the new customer network.

SUMMARY OF THE INVENTION

According to the invention, an apparatus and an architectural solution is provided by extending the existing underlying IP infrastructure and the existing peering relationship between the customer and provider. The invention reduces the latency, improves the handover mechanism and avoids transferring entire contexts across AS. The invention provides a new concept called "virtual firewall" and "virtual security gateway". The invention enables movement of pointers, i.e., movement of memory contents associated with the particular context, at the provider edge and avoids an entire context transfer between the PR and NR. The virtual firewall/security gateway provides instances of firewalls and security gateways and is positioned at the edge of the wireless ISP.

The invention provides an architecture for virtual firewalls and virtual security gateways, a framework and mechanism for firewall and security context transfer, and a policy governance model to accommodate rules and manage the mobile node preferences based on a roaming agreement.

Furthermore, the invention provides an apparatus for creating profiles for subscribers (users) and also the provider for private peering. In addition, the apparatus separates ACL lists for wireline and wireless networks in the firewalls.

According to another embodiment of the invention, the functions of the firewall, security gateway and home agent are moved to the provider that has to provide instances of such functions for each customer. This facilitates the process of conducting context transfer and also eliminates a protocol between these instances for IPSec and firewall context transfer.

Moreover, according to a further embodiment, the invention enables private peering and public peering to support context transfer at the provider edge which enables easier policy control and is more secure, as everything happens in one box.

Policy control and decision to perform the handover still lie in the customer field. The customer manages his/her own subscribers that are not shared till the point of context transfer.

Providing and increasing security to a particular segment of a network provides more control for operators and customers. The invention applies to any type of wireless network.

Moreover, the customer can leverage wireless subscribers and wireline subscribers as separate entities. As a result the management of wireline network resources can be separated and this can be treated as an extension to the existing network rather than changing all the existing network infrastructure at the perimeter of the network.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
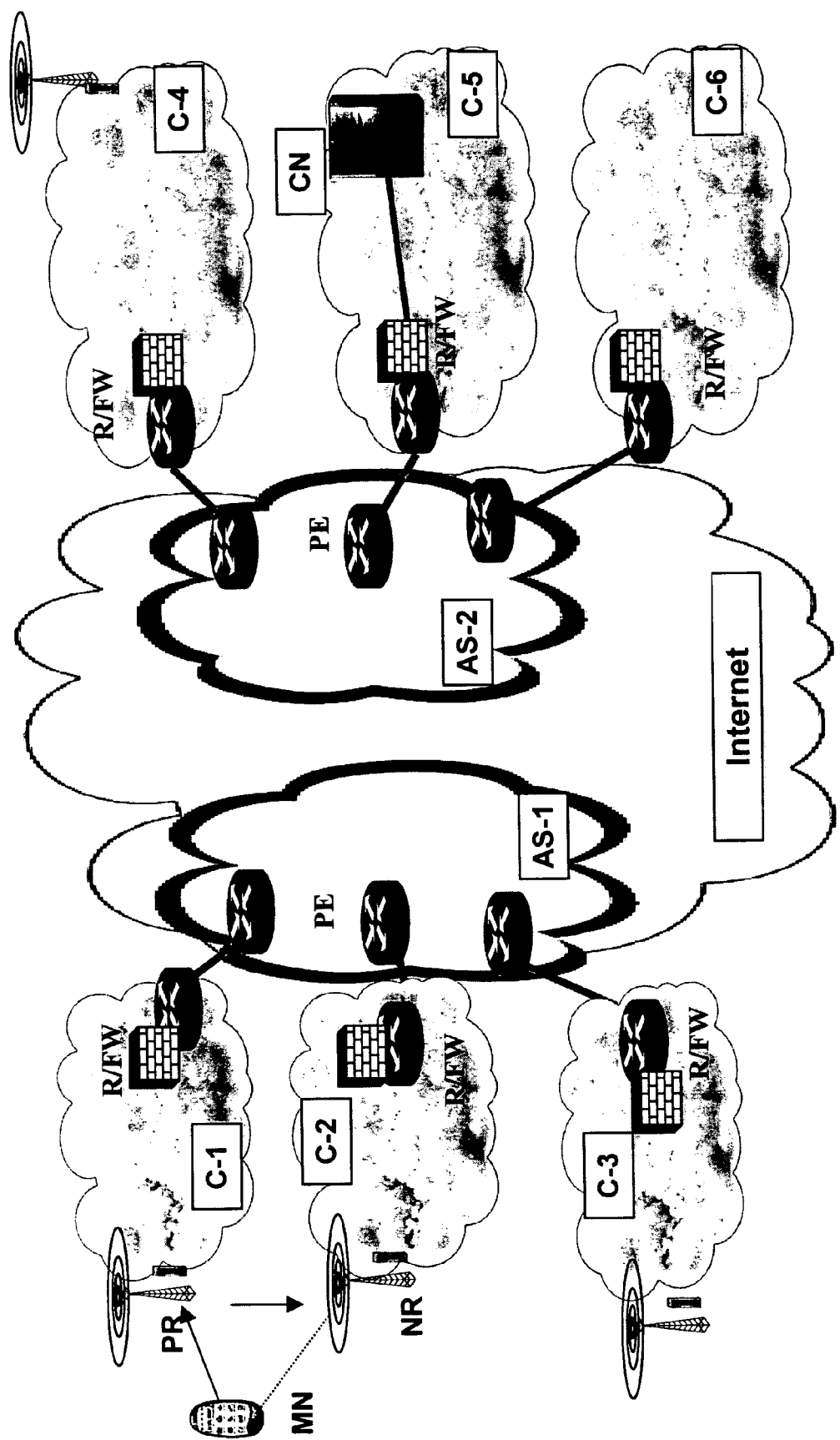
FIG. 1 shows a schematic block diagram illustrating a customer or provider managed network at customer premise according to the prior art.
Figure 2:
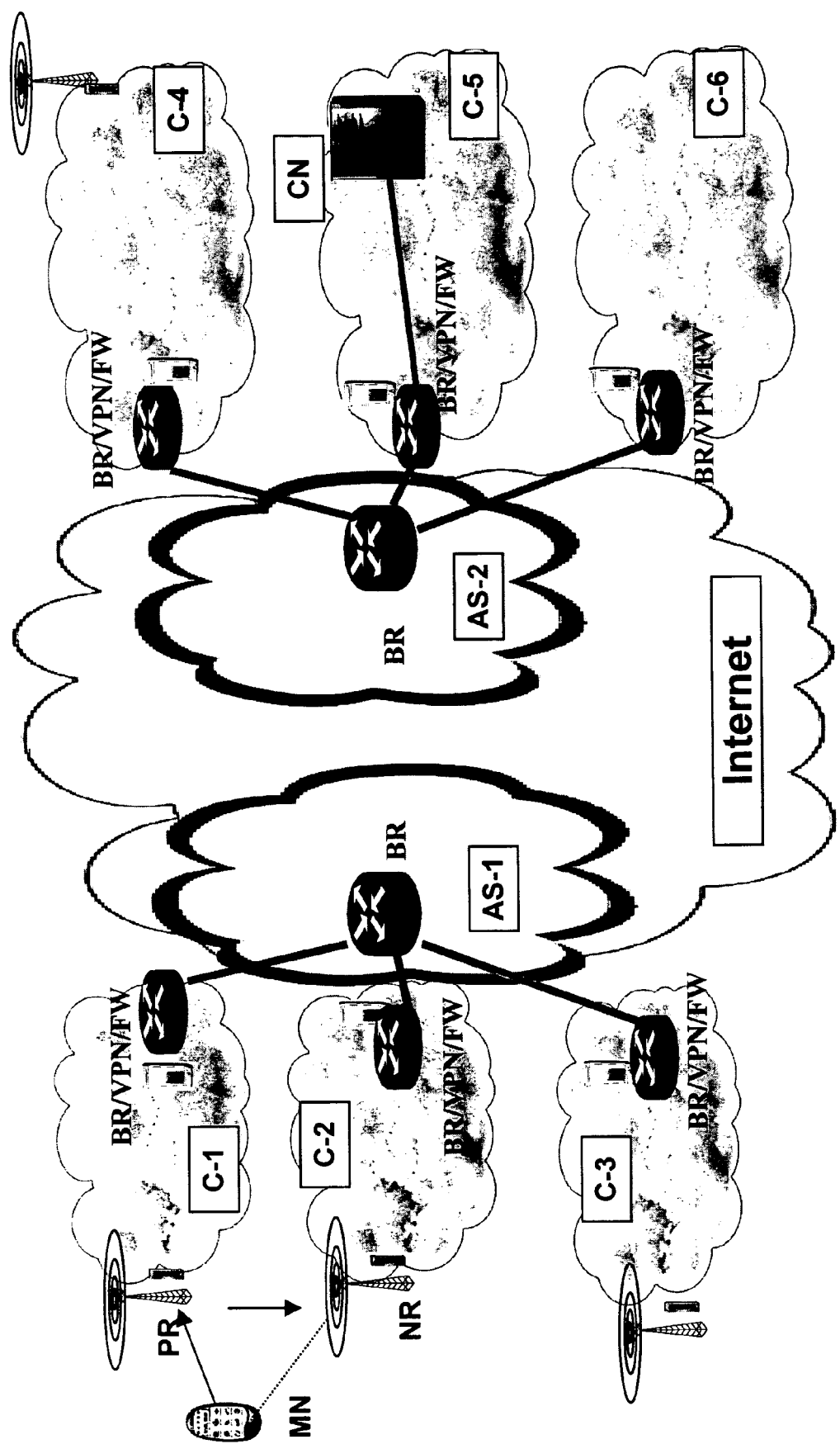
FIG. 2 shows a schematic block diagram illustrating a customer or provider managed network at provider premise according to the prior art.

To provide seamless handover context transfer is one of the important tasks. In the above mentioned references titled "Context transfer: problem statement", "General Requirements for a Context Transfer Framework", "Issues in IPSec Context Transfer", and "IPSec Context Transfer", IPSec context transfer data structure and general context transfer framework are described. Though the general framework assumes that context transfer happens between the PR and NR, it provides a set of message exchanges between the PR and NR and then the NR recreates the context for the MN. If the entire context is available at the PR, then the general framework can be applied directly. But in practice, the IPSec context or firewall context or any other Application Level Gateway (ALG) context may not be physically located at the PR. It may be either located at a DeMilitarized Zone (DMZ) or near the perimeter of the customers network (as shown in FIGS. 1 and 2). This forces the PR to generate an extra message to collect the entire context and then perform the normal context transfer operation to the NR.

In wireline networks, operators are migrating from Asynchronous Transfer Mode (ATM) or Frame Relay based VPN to IP VPN using either MultiProtocol Label Switching (MPLS) or virtual router. This changes the customer network from a peering model to an overlay model and is completely provider provisioned. According to the invention, this is used as underlying principle to leverage some of the context transfer operations to a provider provisioned model.

In the invention, use is made of a distributed routing complex (e.g. see Dave Ginsburg: "Multirouter technology changes everything", www.telecommagazine.com, June 2002, Americas edition, of a traditional routing element.

Figure 3:
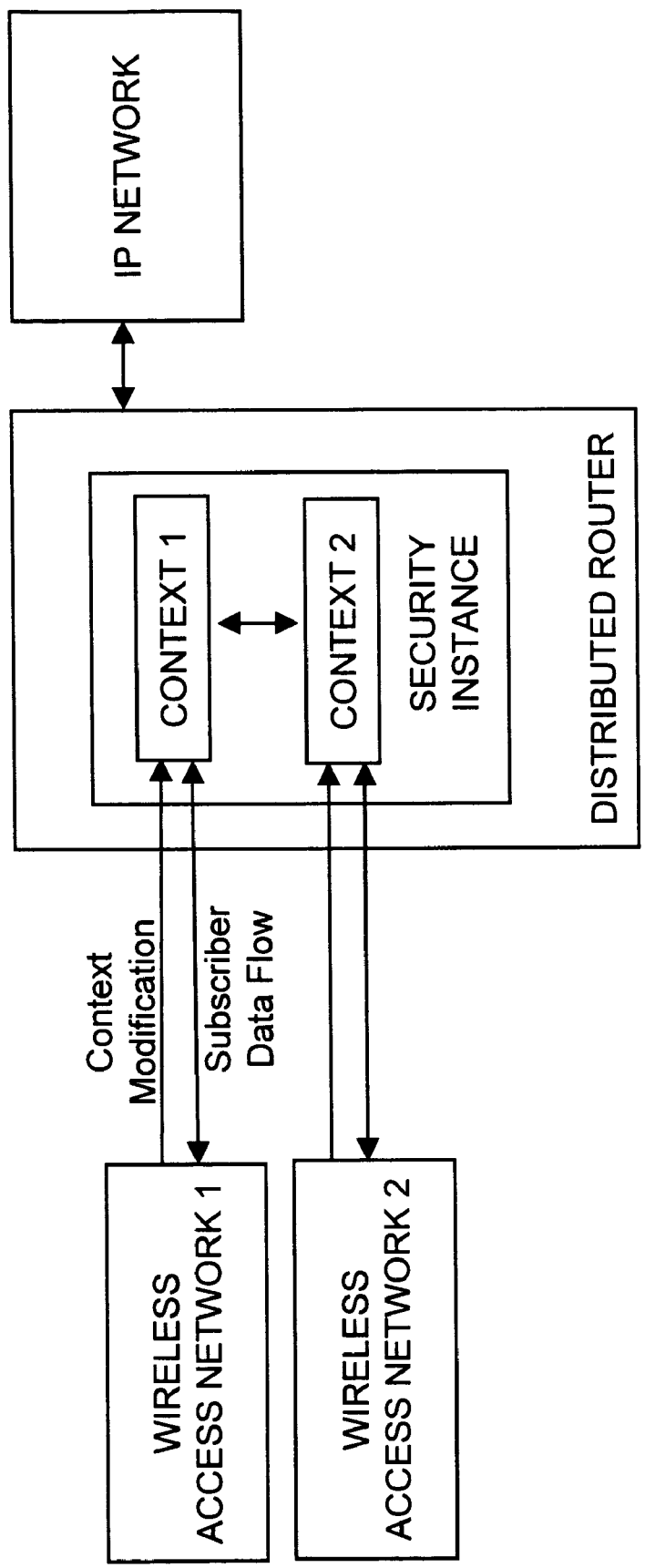
FIG. 3 shows a schematic block diagram illustrating an overview of the idea according to the invention.

FIG. 3 shows, for example, a schematic block diagram illustrating an overview of the idea of the invention. In FIG. 3, a distributed routing device (distributed router) for routing subscriber traffic flow between at least two wireless access networks and an IP network is shown. The distributed routing device includes at least one instance for executing a security function on the subscriber traffic flow, so that physically one security instance for subscribers of the at least two wireless access networks is present and logically each of the at least two wireless access networks has its own security instance.

Each logical part of the security instance is associated with a context of a respective one of the wireless access networks and includes an interface with the respective wireless access network. Via this interface, the context in the logical part can be modified by the associated wireless access network using a management console, for example.

Moreover, in the distributed routing device it may be detected whether the context to be modified is security code such as security keys or parameter, e.g. when automatic keying process is enabled. In case the context is security code, modifying the context from the management console may be inhibited.

The distributed routing device shown in FIG. 3, for example, may further include a device for associating subscribers with the wireless access networks. For example, subscriber association tables may be created indicating subscriber agreements between wireless access networks.

In the distributed routing device it is possible to reorganize a context from a first logical part of the security instance associated with a first wireless access network to a second logical part of the security instance associated with a second wireless access network, e.g. in case of a handover of a subscriber from the first to the second wireless access network. The reorganized context may be a context pertaining to the subscriber handed over from the first to the second wireless access network.

In the following, the invention will be described in greater detail by referring to FIGS. 4 to 7.

According to the invention, each customer instance is incorporated as a context of customer network (wireless access network as mentioned above) in the provider peering routing equipment. In this router (distributed routing device as mentioned above) the context refers to the customer of the ISP and not the mobile node subscriber. Each customer may be serving either fixed (XDSL (Digital Subscriber Line) or cable modem) or wireless (cellular or 802.x) users. For simplicity of the description the term subscriber is used to refer to wireless users, the term "provider" refers to someone who provides edge services to the wireless access networks (i.e. AS-1, AS-2), and "customer" refers to a wireless service provider (i.e. C-1 to C-6). Moreover, it is referred explicitly to the context of a customer as "customer context" and to the context of a subscriber as "subscriber context".

A provider edge router at the provider may interface with one or more customer networks. To support seamless handover it may include an instance of a routing table to support virtual routers, an instance of a firewall FW to support virtual firewalls, an instance of a home agent HA to support virtual home agents, and an instance of a security gateway to support virtual security gateways. Each customer owns his/her subscribers and manages their contexts in the provider router to support his/her subscribers.

Figure 4:
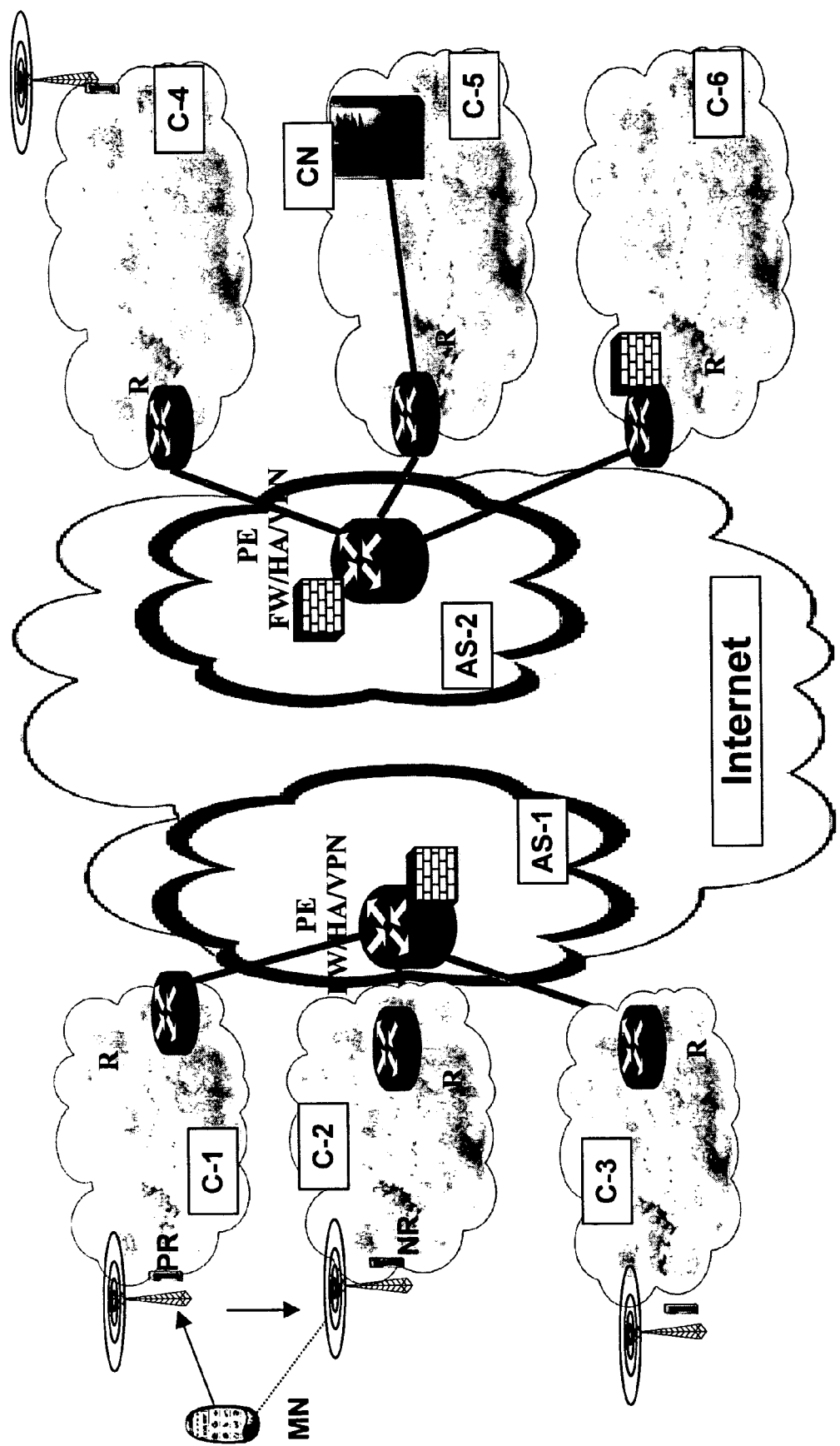
FIG. 4 shows a schematic block diagram illustrating a provider managed distributed router to support virtual SG, firewall and router according to the invention.
Figure 5:
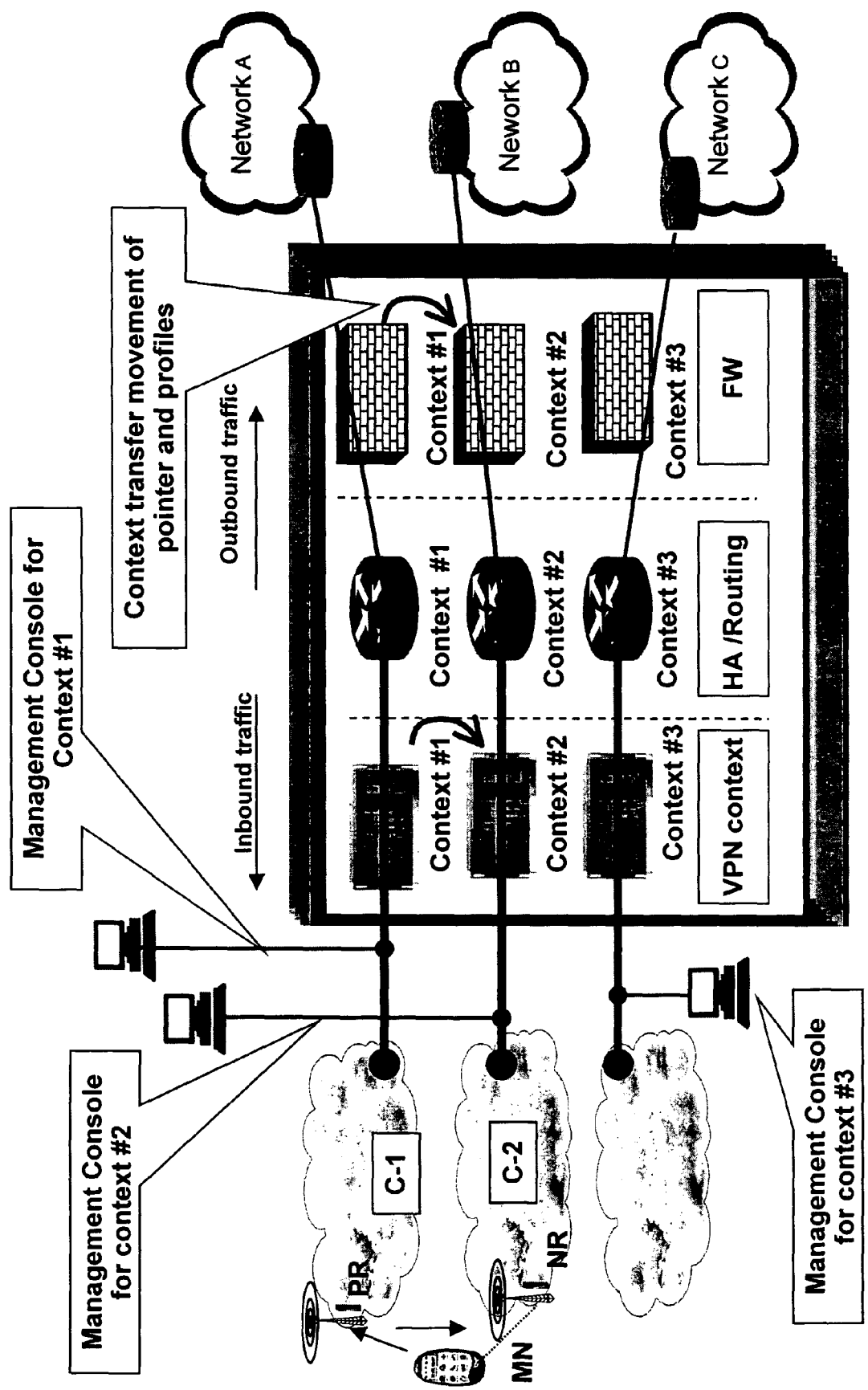
FIG. 5 shows a schematic block diagram illustrating a distributed router supporting various customer contexts according to the invention.

FIG. 4 illustrates an embodiment of the invention where customer networks C-1, C-2 and C-3 are running their own router R and are peering with the provider router AS-1 at the Provider Edge (PE). The AS-1 runs the support functions virtual router, virtual firewall and virtual security gateway. The customer C-1, C-2 and C-3 instances are run on the provider router. Each customer context has its own individual management interface and manages its own subscriber traffic based on the subscriber profiles. FIG. 5, for example, shows the three customer contexts #1 to #3 and each context has three virtual functions, i.e. VPN context, HA/Routing and FW, wherein the instances are not shared among the customer contexts.

According to the example shown in FIG. 5, each subscriber traffic belonging to the respective customer is passed through the series of functions. There is no interaction between contexts of different customers. Each customer can only manage and manipulate the profiles of his/her subscribers, instances or tables belonging to VPN, routing and ACL list via management consoles, for example. A customer cannot see or modify another customer's context.

There may be an additional provision to perform private or public peering with other customers. However, even with this agreement only the customer who owns the context can manipulate his/her instance. Here in this arrangement, the provider provides the network infrastructure and maintains the logical separation of different instances of a network entity.

This concept forms an extension of virtual routing, where different instances of a routing table are run as a single process and logically have different datasets.

Figure 6:
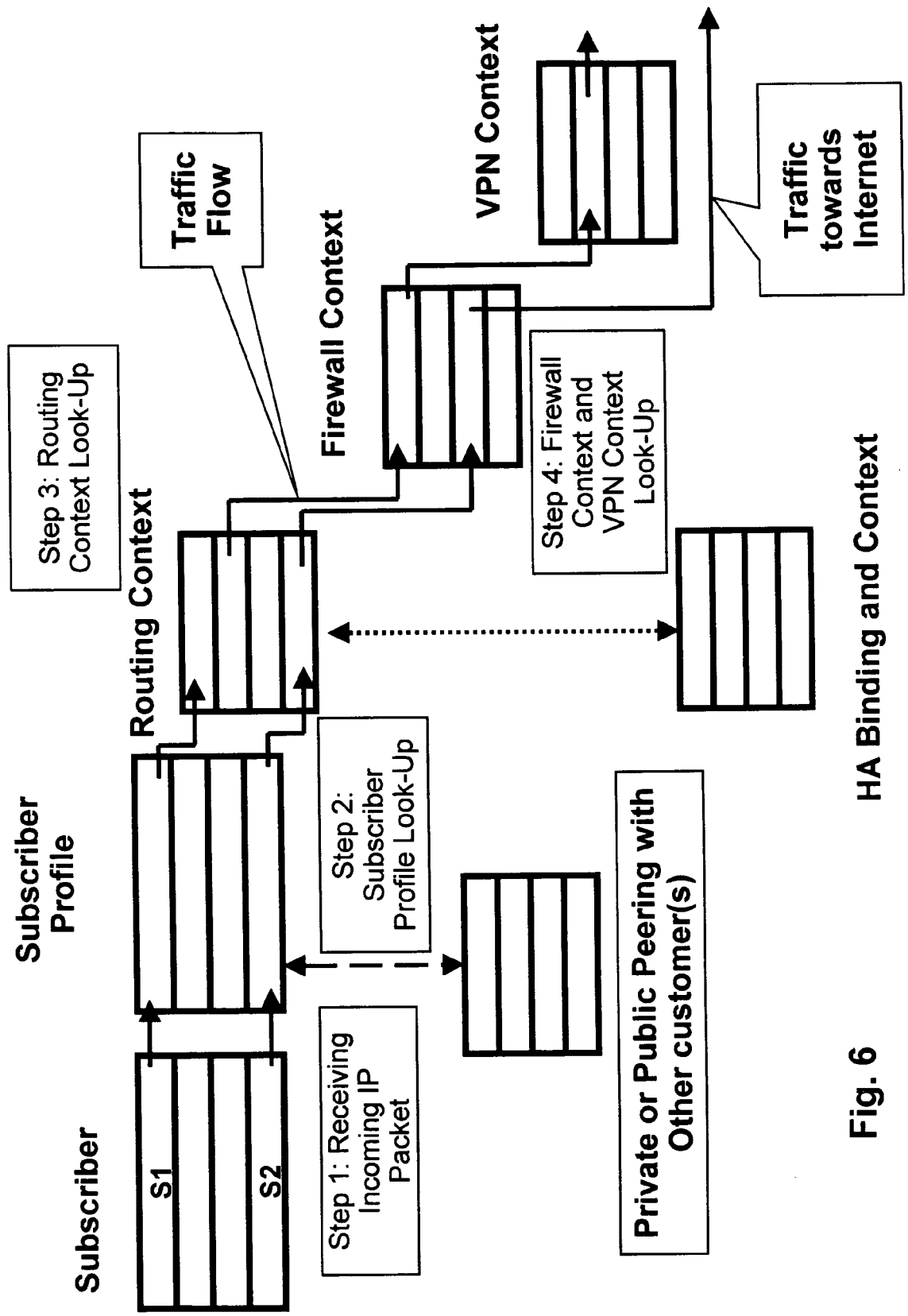
FIG. 6 shows an illustrative flow of subscriber traffic inside the distributed router according to the invention.

Each customer context may have profiles relating to VPN, HA/routing and firewalls. FIG. 6 shows a traffic flow with respect to a user or subscriber belonging to a customer. For example, S1 and S2 are the subscribers of a customer C-4, and roam in a customer network C-1. S1 and S2 will be served based on the Service Level Agreement (SLA) with the provider. This is also referred to as static profiles. When in step 1 in FIG. 6 an incoming IP packet of S1 traffic is received by the provider network, in step 2 a look-up operation is performed in the subscriber traffic profile in the corresponding customer C-1 context database and it is decided how to process the IP packet. Then based on the traffic profile the IP packet may be passed through a series of logical functions. As shown in FIG. 6, the IP packet passes first through the routing context in step 3 where routing look-up is performed on the customer context the subscriber is associated with. Then, in the case where the IP packet requires that treatment, in step 4 the IP packet passes through the firewall context and finally through the VPN context each containing tables for performing look-up operation. Here context in this provider network refers to the customer profile. Firewall or routing or VPN context is an independent logical function as if there were physically separate entities. For subscriber S2 traffic flow passes through the routing and firewall customer C-1 contexts and not through the VPN context.

Each customer manages the list of subscriber profiles. The customer can have private or public peering and this peering can be combined and separate tables which are statically created can be maintained in the distributed routing complex. This peering agreement may be performed offline between two wireless ISPs and typically includes roaming agreement and services that can be provided when the subscribers of their ISP move across the two wireless ISP networks.

Even if there is no private or public peering among the customer networks, if the subscriber has a global agreement then subscriber association tables can be created. The pre-authorization and authentication can take place all at once. When a context transfer occurs between two customer networks C-1 and C-2 as shown in the example of FIG. 5, the contexts pertaining to the subscriber like IPSec context, firewall context and static profiles are just reorganized from customer C-1 context #1 address space to customer C-2 context #2 address space. This avoids an explicit message exchange between two customer networks. In this respect it is noted that the routing context is static and is not moved. When a subscriber or mobile node moves from one network to another, the entry in the Home Agent context (HA context) is updated to reflect the current subscriber location, i.e. the current associated customer network.

For example, a mobile node belongs to a wireless operator network C-1. When the mobile node is powered on or roaming in the customer network C-1, the HA context entry for C-1 with the current network is C-1. When the mobile node moves to a neighboring network C-2, during context transfer the HA context entry is updated with the current network C-2.

Figure 7:
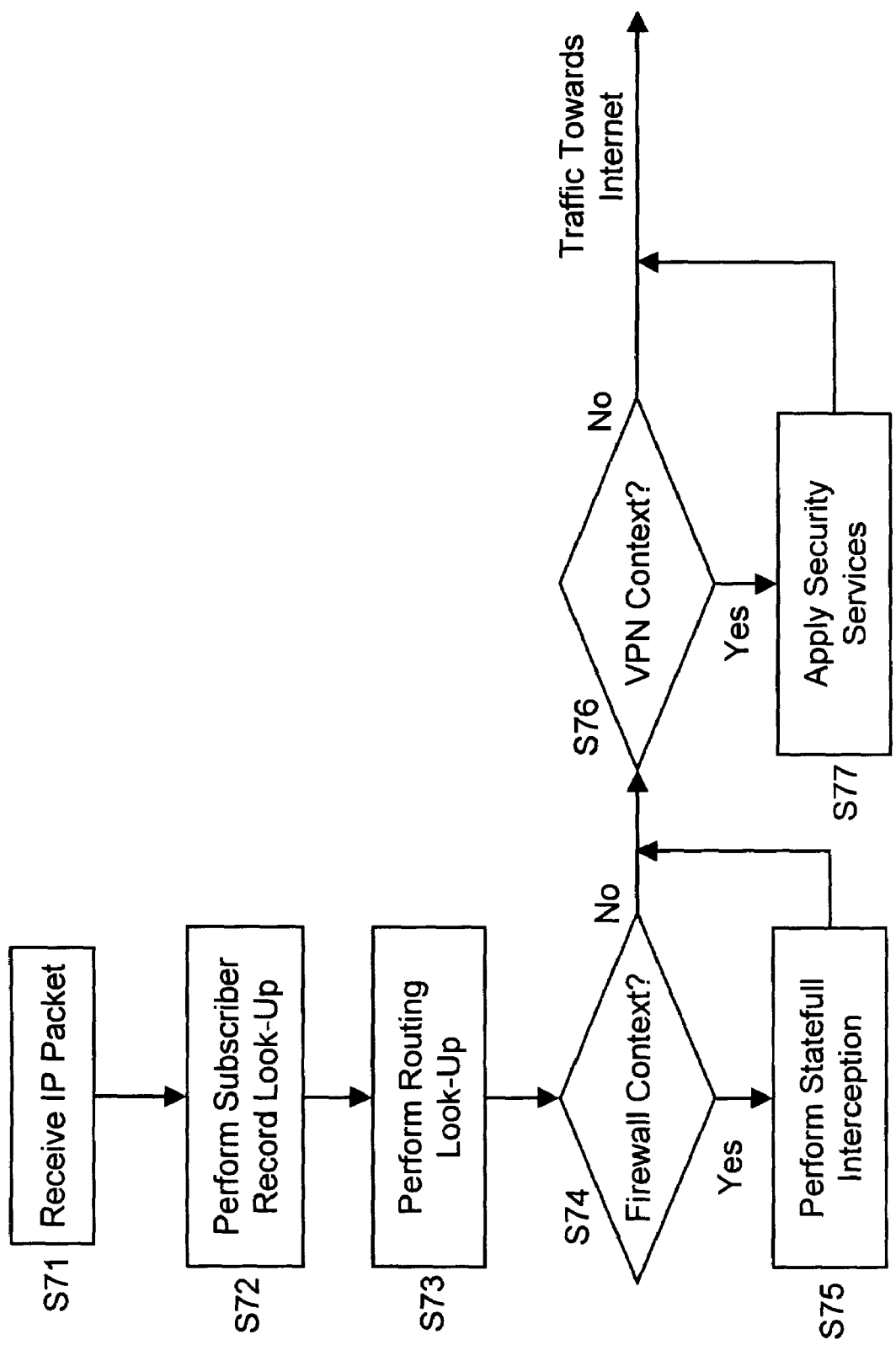
FIG. 7 shows a flow diagram illustrating a subscriber traffic flow according to FIG. 6 in greater detail.

FIG. 7 shows an example of a flow diagram illustrating the subscriber S1 traffic flow according to FIG. 6 in greater detail.

In step S71 an IP packet is received from a mobile node or subscriber S1 at the distributed router. In step S72, a look-up operation is performed on a subscriber record in the distributed router based on a source IP address and a subscription profile of the subscriber S1 is verified. Furthermore, the type of treatment that should be provided for the IP packet is identified. For example, it is determined whether the S1 traffic has to be passed through firewall context and/or VPN context.

In step S73 a routing look-up operation is performed using the routing context associated with the customer network to which the subscriber S1 belongs and the routing context for the subscriber S1 is determined. In step S74 it is decided on the basis of the looked-up subscription profile whether the IP packet has to pass through the firewall context. If YES, in step S75 statefull interception of both inbound and outbound traffic is performed. In step S76 which follows steps S74 and S75, it is decided on the basis of the looked-up subscription profile whether the IP packet has to pass through the VPN context. If YES, in step S77 appropriate security services are applied to both the inbound and outbound traffic for the subscriber S1. If NO in step S76, the traffic is routed towards the Internet without applying security services.

It is noted that the order of steps S73, S74 and S76 is not limited to the examples shown in FIGS. 6 and 7. For example, the order may be changed to S76, S73 and S74 in correspondence with FIG. 5.

As a result of the method and apparatus of the invention, several advantages are provided. For instance, in the case of a context transfer as described above, security keys and parameters are just moved from customer context #1 to customer context #2. These variables cannot be read or modified through the policy console by the customer. These variables can only be modified by Internet Key Exchange (IKE) during negotiation with (CN) Common Name. This prevents the keys from being known by the earlier AS after the handover.

Another advantage is that when a firewall context transfer happens, policies and context parameters, i.e., associated memory contents, pertaining to subscribers are moved just like a pointer in the address space.

A further advantage, as shown in FIG. 6, is that home agent instances can be executed as part of the routing context. This avoids binding updates between them and eliminates the security risk associated with the routing complex.

Current Enterprise or wireline ISPs need not change any element at the perimeter; they can continue to use the existing infrastructure equipment. If they have to support wireless subscribers, they may need to have an additional route to the provider according to the invention supporting virtual firewalls and virtual security gateways. The existing firewall rules will not change; the new firewall at the provider according to the invention maintains information for the wireless subscribers.

For supporting seamless operation customer network may be viewed as a stub network for wireline traffic but for wireless traffic it can act as a transit network to support seamless handover. For wireless networks, during handovers the routers at the perimeter of the network act as a transit network and tunnel the packet to the MN. Careful address allocation and proper firewall and VPN configuration is the key. For example, a customer may still need to run a firewall and VPN service for his network. But this firewall only performs actions pertaining to the wireline network address space and not to the wireless subscribers. This may provide some form of load balancing and provide a clear separation of wireless subscribers and fixed node subscribers. The only place where the context needs to be transferred is if a mobile node moves from one distributed complex to another complex belonging to another AS.

The invention affects most of the network elements (especially third generation infrastructure network elements) in the Internet and is also applicable to the service and middle box equipments like NAT, ALG, and Security Gateway, Firewall, Router, etc.

As part of the handover process an operator may have to move all the information pertaining to mobile phone to another operator, i.e perform a context transfer. It is important that these contexts are moved quickly to avoid service interruption to the mobile phones. The invention provides an apparatus and a method that avoid moving of security and firewall context. These apparatus and method involve various functions of network elements and managing and controlling those network elements at the provider edge. According to the embodiments of the invention, provided are: 1) An architecture and an apparatus and method to avoid security and firewall context transfer. This is achieved by means of virtual firewalls and virtual security cateways at the provider edge in 3G access networks. 2) An apparatus and method to avoid security and firewall context transfer during handovers. The apparatus and method involve a simple movement of pointers across logical instances of firewall and security gateway at the provider edge. 3) An apparatus and method to securely manage both subscriber and customer information at the provider edge, for creating dynamic profiles to support pre-authorization. 4) A security mechanism to avoid reading security state variable and SA key parameters by means of supporting, negotiation technique.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
a router configured to route subscriber traffic flow between at least two wireless access networks and an internet protocol network, wherein the at least two wireless access networks correspond to different customer networks;
a generator configured to generate at least one instance for executing a security function on a subscriber traffic flow, so that physically one security instance for subscribers of at least two wireless access networks is present and logically at least one of the at least two wireless access networks has a respective security instance; and
a reorganizer configured to reorganize a context from a first logical part of the security instance associated with a first wireless access network of the at least two wireless access networks to a second logical part of the security instance associated with a second wireless access network of the at least two wireless access networks.

2. The apparatus according to claim 1, wherein the reorganizer is configured to reorganize the context from the first logical part to the second logical part in case of a handover of a subscriber from the first wireless access network to the second wireless access network.

3. The apparatus according to claim 1, wherein at least one logical part of the security instance is associated with a context of a respective one of the wireless access networks and comprises an interface with the respective wireless access network.

4. The apparatus according to claim 1, further comprising an associating device configured to associate the subscribers with the at least two wireless access networks.

5. The apparatus according to claim 1, wherein the security function comprises at least one of a virtual private network, routing and firewall function.

6. The apparatus according to claim 1, wherein the apparatus is located at a provider edge of the internet protocol network.

7. A method comprising:
providing at least one instance to execute a security function on subscriber traffic flow routed between at least two wireless access networks and an internet protocol network, wherein the at least two wireless access networks correspond to different customer networks, by logically separating the at least one instance for at least two wireless access networks, so that physically one security instance for subscribers of the at least two wireless access networks is present and logically at least one of the at least two wireless access networks has a respective security instance; and
reorganizing a context from a first logical part of the security instance associated with a first wireless access network of the at least two wireless access networks to a second logical part of the security instance associated with a second wireless access network of the at least two wireless access networks.

8. The method according to claim 7, wherein the reorganizing comprises reorganizing the context from the first logical part to the second logical part in case of a handover of a subscriber from the first wireless access network to the second wireless access network.

9. The method according to claim 8, wherein the reorganizing comprises reorganizing a handover context pertaining to the subscriber handed over from the first wireless access network to the second wireless access network.

10. The method according to claim 7, further comprising:
associating at least one logical part of the security instance with a context of a respective one of the wireless access networks; and
providing an interface between the at least one logical part and the respective associated wireless access network.

11. The method according to claim 10, further comprising:
modifying the context in the at least one logical part by the associated wireless access network via the respective interface.

12. The method according to claim 11, further comprising:
detecting whether the context to be modified comprises a security code; and
in case the context comprises the security code, inhibiting the modifying of the context.

13. The method according to claim 7, further comprising:
associating the subscribers with the wireless access networks.

14. A network node comprising:
a connection configured to communicatively connect a network node to a distributed routing device configured to route subscriber traffic flow to and from an internet protocol network, wherein the distributed routing device is configured to route subscriber traffic flow between at least two wireless access networks and an internet protocol network, wherein the at least two wireless access networks correspond to different customer networks, and the distributed routing device comprises at least one instance configured to execute a security function on a subscriber traffic flow, so that physically one security instance for subscribers of at least two wireless access networks is present and logically at least one of the at least two wireless access networks has a respective security instance, wherein at least one logical part of the security instance is associated with a context of a respective one of the wireless access networks and comprises an interface with the respective wireless access network; and a modifying device configured to modify the context in the at least one logical part of the security instance associated with the respective one of the wireless access network via a respectively provided interface.

15. A network system comprising:

at least two wireless access networks and a distributed routing device configured to route subscriber traffic flow between the at least two wireless access networks and an internet protocol network, wherein the at least two wireless access networks correspond to different customer networks, wherein the distributed routing device is configured to route subscriber traffic flow between at least two wireless access networks and an internet protocol network, and the distributed routing device comprises at least one instance configured to execute a security function on a subscriber traffic flow, so that physically one security instance for subscribers of at least two wireless access networks is present and logically at least one of the at least two wireless access networks has a respective security instance, and a reorganizer configured to reorganize a context from a first logical part of the security instance associated with a first wireless access network of the at least two wireless access networks to a second logical part of the security instance associated with a second wireless access network of the at least two wireless access networks.

16. An apparatus, comprising:

routing means for routing subscriber traffic flow between at least two wireless access networks and an internet protocol network, wherein the at least two wireless access networks correspond to different customer networks;

generating means for generating at least one instance for executing a security function on a subscriber traffic flow, so that physically one security instance for subscribers of at least two wireless access networks is present and logically at least one of the at least two wireless access networks has a respective security instance; and reorganizing means for reorganizing a context from a first logical part of the security instance associated with a first wireless access network of the at least two wireless access networks to a second logical part of the security instance associated with a second wireless access network of the at least two wireless access networks.

17. A network node comprising:

connection means for communicatively connecting a network node to distributed routing means for routing subscriber traffic flow to and from an internet protocol network, wherein the distributed routing means routes subscriber traffic flow between at least two wireless access networks and an internet protocol network, wherein the at least two wireless access networks correspond to different customer networks, and the distributed routing device comprises at least one instance for executing a security function on a subscriber traffic flow, so that physically one security instance for subscribers of at least two wireless access networks is present and logically at least one of the at least two wireless access networks has a respective security instance, wherein at least one logical part of the security instance is associated with a context of a respective one of the wireless access networks and comprises an interface with the respective wireless access network; and modifying means for modifying the context in the at least one logical part of the security instance associated with the respective one of the wireless access network via a respectively provided interface.

* * * * *